July 15, 1969  A. M. LEVINE ET AL  3,455,153

TREADMILL FOR TESTING AUTOMOBILES

Filed Jan. 17, 1967  2 Sheets-Sheet 1

INVENTORS
Aaron M. Levine
Bernard S. Blumenthal
BY

AGENT

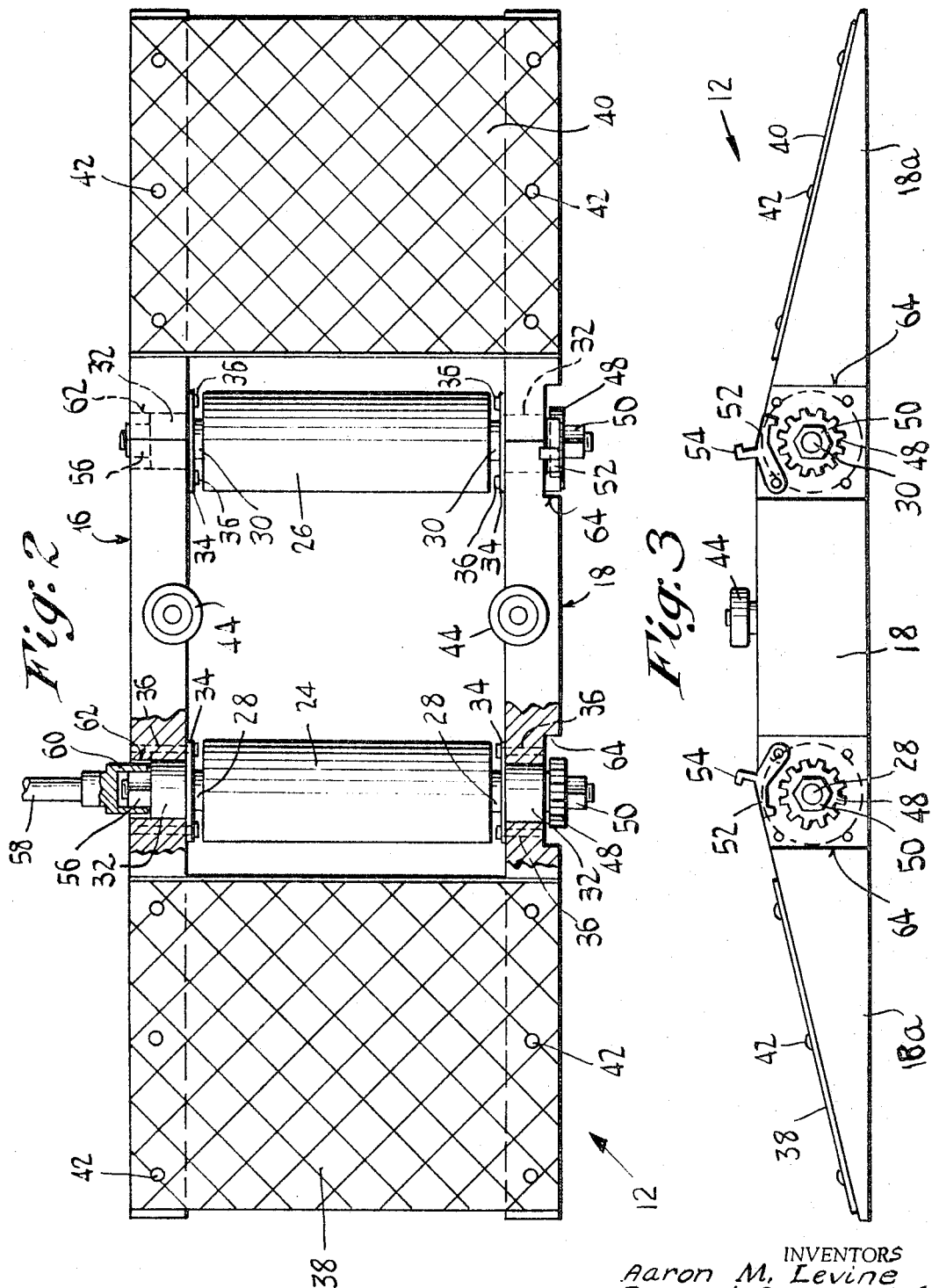

United States Patent Office 3,455,153
Patented July 15, 1969

1

3,455,153
TREADMILL FOR TESTING AUTOMOBILES
Aaron M. Levine, 105 Diamond St., New Haven, Conn. 06515, and Bernard S. Blumenthal, N. Westwood Road, Ansonia, Conn. 06401
Filed Jan. 17, 1967, Ser. No. 609,885
Int. Cl. G01m 15/00
U.S. Cl. 73—117                    2 Claims

ABSTRACT OF THE DISCLOSURE

A vehicle testing treadmill combination having units for individual rear wheels, each of said units having a sloped treadplate ahead of a pair of horizontal spaced cradle rollers all carried by two spaced side rails which have side guide rollers engageable with opposite sides of the vehicle wheel and which also have releasable locks to hold the cradle rollers from turning as the vehicle is driven onto or off the treadmill.

CROSS REFERENCE

BACKGROUND

This invention relates to automobile treadmills or wheel cradles, and more particularly to treadmills for the individual driving wheels of a vehicle to enable tests to be performed on the driving mechanism of the automobile.

In a prior treadmill of the above type a rectangular cast metal frame carried two spaced flanged rollers turnable on roller bearings through which stationary shafts passed. This prior device was difficult to safely position under or remove from the vehicle wheel without the use of jacks or similar auxiliary equipment, as by using only the driving and braking power of the car. It was moreover expensive to produce, requiring specially fabricated parts that were either expensive or not available on the open market, and in addition necessitated a precise positioning and alignment with respect to said wheel.

SUMMARY

The present invention obviates the above drawbacks, and objects of the invention include the provision of a novel and improved automobile testing treadmill which enables the car to be quickly and safely driven onto and off it, using the car controls and without requiring additional or auxiliary equipment. This is accomplished by the provision of a combination embracing individual portable units each comprising sloped wheel-tread plates ahead of lockable wheel cradling rollers, all carried by sturdy side rails which have side guide rollers and also operable latches or locks for holding the cradle rollers from turning as the car is driven onto or off the treadmill.

Other objects and advantages are embraced in a treadmill construction as above, which involves relatively few parts mostly of non-special, standard construction generally available on the open market whereby the fabricating cost is low, a treadmill which does not require a precise positioning and alignment with respect to the car wheel, a treadmill in accordance with the foregoing, comprising two identical units which may be readily, sturdily coupled together for simultaneous turning of the rollers under power supplied through the car transmission, a treadmill as characterized, which is small, compact, relatively light in weight and readily portable, and which may be used on any substantially flat floor or ground surface.

Other features and advantages will hereinafter appear.

In the drawings:

2

FIG. 2 is a top plan view on one treadmill unit, on a larger scale.

FIG. 3 is a side elevational view of the treadmill unit of FIG. 2.

Figure 1:
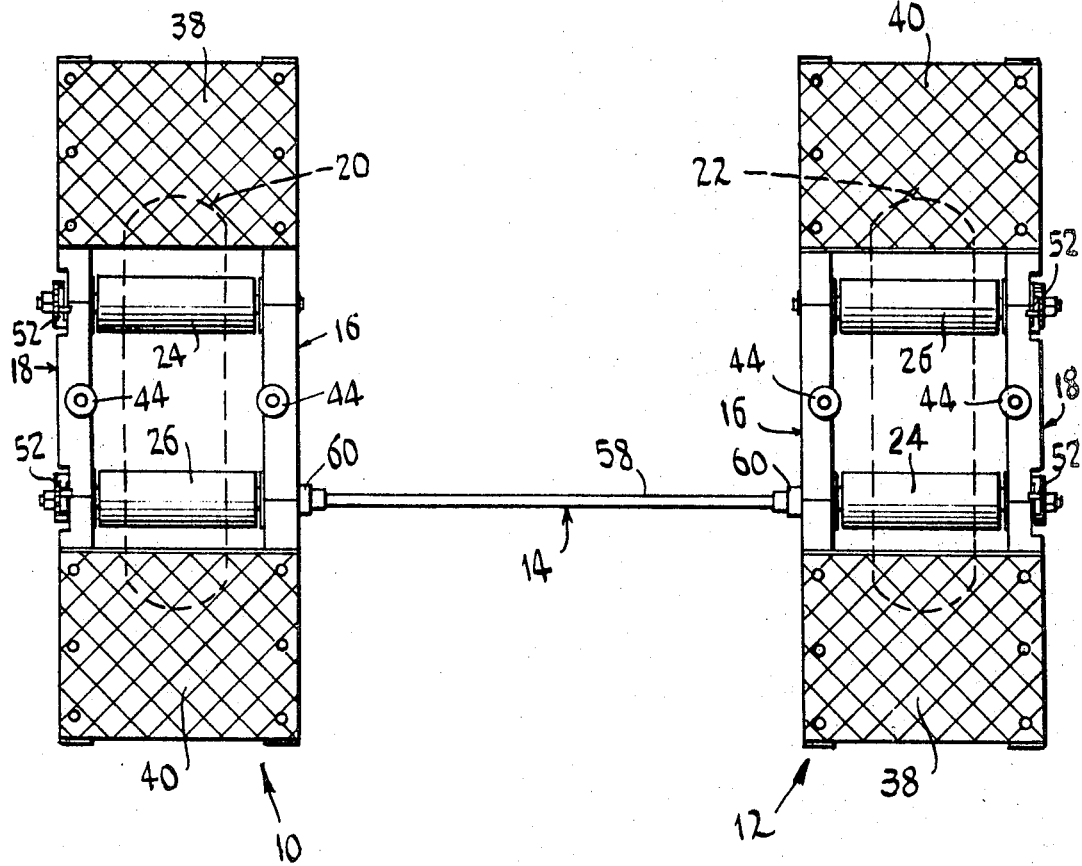
FIG. 1 is a top plan view, on a reduced scale, of a set of coupled treadmill units as provided by the invention.

As shown, the improved vehicle treadmill construction of this invention comprises essentially a pair of portable, individual wheel-cradling units 10, 12 which are spaced apart a distance equal to the tracking distance of automobile wheels, said units being adapted to enable the rear wheels of a car to be run up upon them and to be cradled thereby and supported for turning or running movement. The units 10, 12 are mechanically coupled to each other by a tie means 14 whereby the wheel-supporting rollers thereof are caused to turn simultaneously at the same speed and in the same direction, thereby automatically equalizing the running speed of the rear wheels of the automobile.

The wheel-cradling units 10, 12 are of identical construction, and accordingly corresponding parts of the units have been given identical numbers, with the description relating specifically to one unit.

Considering FIGS. 2 and 3, the wheel-cradling unit 12 comprises a pair of substantially parallel side rails 16, 18 which have a spacing greater than the width of an automobile wheel and less than the width of a car. In FIG. 1, the rear automobile wheels are indicated at 20, 22, giving an approximation of the size of the wheel-cradling units 10, 12 as well as the spacing of the side rails 16, 18. The rails 16, 18 may be advantageously constructed of wood, although steel or other materials can be utilized as well. The treadmill unit 12 comprises a pair of horizontal, parallel, spaced, wheel-cradling rollers 24, 26 disposed and extending between the side rails 16, 18 and adapted to cradle and support the rear wheel 22 of the automobile. The rollers 24, 26 are carried on shafts 28, 30 which pass through the side rails 16, 18 and are journaled in anti-friction ball or roller bearing assemblages 32. The assemblages 32 have mounting flanges 34 which are secured, by means of bolts 36, to the side rails 16, 18. The cradling rollers 24, 26 may be advantageously about four and one-quarter inches in diameter, and may have a spacing between centers of fifteen and one-half inches approximately.

Referring to FIG. 3, the side rails 16, 18 are formed with end portions 16a and 18a which taper in height. Inclined tread plates 38, 40 are provided, resting on the pairs of corresponding end portions 16a, 18a. The tread plates 38, 40 are preferably of aluminum, having the usual well-known anti-skid surface projections commonly found on floor plates, tread plates and the like. The tread plates 38, 40 may be secured to the side rails 16, 18 in any desired manner, as by the use of lag screws or bolts 42. The side rails 16, 18 may be advantageously about five inches in height, and the tapered end portions may have a length of approximately nineteen inches each.

With the above organization, the tread plates 38, 40 are adapted to lead the car wheels onto the rollers 24, 26 under the motive and braking power of the car itself. The invention further provides means for enabling the rear wheels of the car to be driven onto the cradling units 10, 12 safely and quickly, as will be shortly brought out.

Carried by the upper portions of the side rails 16, 18 intermediate the ends thereof are side guide rollers 44, said rollers being at a level above the horizontal cradling rollers 24, 26 and being adapted to engage opposite sides of the car wheels to limit sidewise movement of the car during the testing operation.

To facilitate the running on and off of the rear car wheels 20, 22, the invention provides a pair of releasable lock means for each of the units 10, 12, associated respectively with the horizontal rollers 24, 26. As shown in FIGS. 2 and 3, the lock means comprises toothed wheels 48 carried on the shafts 28, 30, said wheels being rigidly secured in place by hexagonal nuts 50. Cooperable with the toothed wheels 48 are locking levers 52 which are pivoted on the side rails 18, said levers having teeth which are engageable with the teeth of the wheels 48 to securely lock the same against rotation in either direction. The locking levers 52 have upstanding handle portions 54 which project upward beyond the top of the side rail 18 to enable the levers to be readily manually actuated for the purpose of either locking or unlocking the associated cradling rollers 24, 26.

When the rollers 24, 26 are locked against turning, the rear driving wheels of the vehicle may be readily driven onto the cradling unit 10, 12 quickly and safely without the necessity for jacks or other auxiliary equipment, merely by utilizing instead the driving and braking facilities of the car itself. After the car wheels have been properly cradled in the rollers 24, 26, the locking levers 52 are shifted to unlock the rollers whereupon the car wheels may be driven by the car engine via the automatic transmission, to test the performance of the transmission.

The separable coupling means between the units 10, 12 includes hexagonal nuts 56 which are rigid on the shifts 28, 30, being secured thereto by shear pins or cotter pins or the like. The hexagonal nuts 56 are termed herein "splined heads," since they may have other shapes comprising projecting keys, spline grooves or the like. One pair of cradling rollers 24, 26 (FIG. 1) are coupled to each other for simultaneous turning by a tie rod 58 having at its two ends hexagonal nut-wrench or keying sockets 60 adapted to slidably receive the splined heads or nuts 56 as shown in FIG. 2.

The side rails 16 have guard recesses 62 in which the nuts 56 are disposed and by which they are shielded whereby the outer faces of the nuts are substantially flush with the side surface of the rail 16. The sockets 60 fit loosely into the recesses 62, and by such construction there is had a more compact assemblage with fewer protruding parts. Also, the shafts 28, 30 can be shorter, and the splined heads 56 can be disposed against the anti-friction bearing assemblages 32 to provide a more sturdy construction. As seen in FIGS. 2 and 3, the side rails 18 have recesses 64 in which the toothed wheels 48 and locking levers 52 are disposed, thereby further eliminating projecting parts at the sides of the cradling units 10, 12.

When in operation, the units 10, 12 and the coupling means 14 are placed as shown in FIG. 1, and the cradling rollers 24, 26 are locked by the locking levers 52. The driving wheels of the automobile are now driven up onto the cradling rollers 24, 26 and blocks placed at the remaining wheels, after which the locking levers 52 are released to unlock the rollers. The car may now be placed in gear, thereby to provide driving power for the car wheels 20, 22. The car engine can be run at various speeds as desired to test the performance of the car transmission. The wheel-cradling treadmill equipment of the present invention is generally useful in testing the various driving mechanisms of automobiles, and is particularly useful in testing automatic transmissions, as will be now understood. The transmission performance may be checked at various simulated car speeds, as obtained by running the engine at different speeds.

The vehicle treadmill construction as above set forth eliminates the necessity for utilizing jacks or other auxiliary equipment, in order to cradle the car wheels for checking the transmission performance. Instead, the car may be driven onto the treadmill units 10, 12 utilizing its own power and braking equipment.

After completion of the performance test, the car is taken out of gear, and the brakes applied to halt the turning of the driving wheels 20, 22. The locking levers 52 are then shifted to lock the cradling rollers 24, 26 whereupon the car may be driven off the treadmill.

It will now be understood that we have provided an improved vehicle treadmill construction which enables a diagnosis and performance test of automobile driving systems, engines etc. to be had, and particularly enables automatic transmissions to be easily and quickly tested. The treadmill construction is relatively simple, sturdy and foolproof in its construction, and economical to fabricate. The units are small, relatively light in weight, and may be utilized on any substantially flat floor or ground surfaces, without special installation equipment.

Variations and modifications may be made within the scope of the claims, and portions of the improvements may be used without others.

We claim:

1. A vehicle treadmill construction for testing the performance of automobile drive devices while operating in a car, comprising in combination a pair of relatively light and movable, individual, unjoined and readily portable floor treadmill units, each treadmill unit comprising:
   (a) a pair of substantially parallel side rails having a spacing greater than the width of an automobile wheel and less than the width of a car,
   (b) a pair of horizontal parallel spaced rollers disposed and extending between said side rails and adapted to cradle and support the rear wheel of a car,
   (c) anti-friction bearings carried by said rails and mounting said rollers for rotation,
   (d) a pair of side guide rollers carried by the upper portions of said rails and at a level above the horizontal rollers,
   (e) a pair of inclined tread plates extending between and secured over the rails respectively ahead of and beyond the horizontal rollers and adapted to lead, the car wheels onto and off said rollers, and
   (f) a releasable lock means associated with one of the horizontal rollers, for locking the same against rotation to enable the car wheel to be readily driven onto and off the horizontal rollers under the action of the car engine and brakes,
   (g) said treadmill units being disposed in spaced, side-by-side relation with a spacing essentially equal to that of the car wheels, and
   (h) separable coupling means extending between the treadmill units, connecting together for simultaneous turning movement one cradle roller of each unit.

2. A vehicle treadmill construction as in claim 1, wherein:
   (a) the separable coupling means comprises splined heads connected to and turning with the coupled rollers,
   (b) a pair of keying sockets adapted to removably fit over the splined heads, and
   (c) a tie bar connected to and extending between the said sockets,
   (d) said side rails having guard recesses in which the splined heads are wholly received and shielded,
   (e) said keying sockets extending into said guard recesses.

References Cited

UNITED STATES PATENTS

| | | | |
|---|---|---|---|
| 1,923,649 | 8/1933 | Warner | 64—23 |
| 2,601,187 | 6/1952 | Volis | 73—117 X |
| 2,781,659 | 2/1957 | Parker | 73—117 X |
| 3,277,703 | 10/1966 | Cline | 73—117 X |

RICHARD C. QUEISSER, Primary Examiner

JERRY W. MYRACLE, Assistant Examiner